(12) United States Patent
Mehtab et al.

(10) Patent No.: US 11,500,126 B2
(45) Date of Patent: Nov. 15, 2022

(54) DOWNSCALING WEATHER FORECASTS

(71) Applicant: YARA INTERNATIONAL ASA, Oslo (NO)

(72) Inventors: Syed Mehtab, Singapore (SG); Taewon Yeon, Singapore (SG); Alexander Toporov, Singapore (SG); Navin Twarakavi, Bangalore (IN); Ruan Boezaart, Singapore (SG)

(73) Assignee: YARA INTERNATIONAL ASA, Oslo (NO)

( * ) Notice: Subject to any disclaimer, the term of this patent is extended or adjusted under 35 U.S.C. 154(b) by 0 days.

(21) Appl. No.: 17/298,092

(22) PCT Filed: Jan. 31, 2020

(86) PCT No.: PCT/EP2020/052470
§ 371 (c)(1),
(2) Date: May 28, 2021

(87) PCT Pub. No.: WO2020/157300
PCT Pub. Date: Aug. 6, 2020

(65) Prior Publication Data
US 2022/0035073 A1    Feb. 3, 2022

(30) Foreign Application Priority Data

Jan. 31, 2019   (EP) .................................. 19154764

(51) Int. Cl.
*G01W 1/10*   (2006.01)
*G01W 1/00*   (2006.01)

(52) U.S. Cl.
CPC ........ *G01W 1/10* (2013.01); *G01W 2001/006* (2013.01)

(58) Field of Classification Search
CPC .......................... G01W 1/10; G01W 2001/006
See application file for complete search history.

(56) References Cited

U.S. PATENT DOCUMENTS

| 6,240,369 B1 * | 5/2001 | Foust ...................... G01W 1/00 |
| | | 702/3 |
| 9,772,428 B2 | 9/2017 | Asrani |
| 2008/0105045 A1 * | 5/2008 | Woro ...................... G01W 1/12 |
| | | 73/170.27 |

(Continued)

OTHER PUBLICATIONS

PCT International Search Report and Written Opinion issued in PCT Application No. PCT/EP2020/052470; dated Apr. 24, 2020; 13 pages.

(Continued)

*Primary Examiner* — Yoshihisa Ishizuka
(74) *Attorney, Agent, or Firm* — Dilworth IP, LLC (57) ABSTRACT

A method for downscaling a weather forecast including obtaining a sky image and location data indicative of a user location via a mobile computing device; sending the location data to a weather forecast provider; generating, by the weather forecast provider, a local weather forecast for the user location; sending the local weather forecast to a server; determining, by the mobile computing device, cloud cover data and cloud type data based on the sky image, and sending the cloud cover data and cloud type data to the server or sending the sky image to the server and determining cloud cover data and cloud type data based on the sky image; increasing the resolution of the local weather forecast based on the cloud cover data and the cloud type data, thus obtaining a downscaled local weather forecast; and, sending the downscaled local weather forecast to the mobile computing device.

21 Claims, 3 Drawing Sheets

(56) References Cited

U.S. PATENT DOCUMENTS

2017/0351006 A1* 12/2017 Bharadwaj ............. G06V 20/13
2017/0351970 A1   12/2017 Abedini et al.
2018/0372914 A1   12/2018 Yan et al.

OTHER PUBLICATIONS

EP Search Report in EP Application No. 19154764.5; dated Jul. 15, 2019, 8 pages.

* cited by examiner

DOWNSCALING WEATHER FORECASTS

TECHNICAL FIELD

The present invention is in the field weather forecasting, and in particular in the field of high resolution weather forecasting.

BACKGROUND

Weather forecasting companies offer the weather forecasts globally with personalized and actionable insights to millions of consumers and thousands of businesses. The goal of the weather forecast solutions is to connect people with the weather intel they need, on any device. To accomplish this task, weather forecast companies aggregate the deepest, richest data sets—both business and consumer—to deliver personal, reliable and actionable weather information, analytics and insight.

Currently, these weather forecasts are provided globally for various time spans (current, 15-days, seasonal) and are pixelated with a resolution that is in the order of magnitude of several kilometres. For example, IBM weather forecasts are provided for various time spans at a resolution of 4 km. In the market today, companies such as Dark Sky, IBM and Understory, provide these services by using cutting-edge forecast modelling techniques on spatial and temporal scales; however these forecasts differ greatly, see J. Anderson, "Operation of Live, Local Weather Information in Decision Support Tools for Agriculture," p. 7. (n.d.) and Forecast Watch, "Three Region Accuracy Overview, 2010 through June 2016," (2016).

Weather forecasts typically contain several types of information: air temperature, amount of rain/precipitation, wind direction and/or speed, cloud type and/or altitude, atmospheric pressure, humidity, and sun brightness or sunshine. This information is very important for a number of people, in particular farmers, who need to adapt their daily work to the weather forecast. To maximize the yield of their crops with the investment available, they need precise weather data to make the best decisions regarding for example fertilizer or crop protection applications, or crop harvests.

US 2018/0372914 A1 discloses techniques for local weather forecast using a local weather forecast model, wherein the techniques include generating data indicative of future weather conditions for a plurality of locations based at least on future forecast data provided by an existing forecast provider and a correlation between data collected by a plurality of data collection devices and historical data provided by the existing forecast provider. Historical cloud information must be present at the location of interest.

US2017/0351970 A1 discloses the prediction of solar irradiation based on input terrestrial sky images comprising cloud images, the terrestrial sky images taken from a plurality of geographic locations by a plurality of devices; for example, wherein the terrestrial sky images are crowd sourced from the plurality of devices. A plurality of devices is required to obtain the terrestrial sky images.

Even though the weather forecasts provided are impressive, they still do not serve the purpose of farmers whose land holdings are much smaller. Further, weather drives various physiological responses of plants, such as crops, making the importance of accurate information vital to the farmer.

Furthermore, existing weather feeds all have differing geographical variances in predictive accuracy. Weather feeds typically supply averages, but will not divulge that region X is not as accurate as region Y. Therefore, farmers relying on a highly rated weather feed, but operating in a "weak" spot, may require a weather feed that is less accurate overall but more accurate at their specific location.

SUMMARY

There remains a need to further increase the accuracy and resolution of weather forecasts.

The present methods and systems address these needs. The present invention particularly deals with downscaling the weather forecasts provided at kilometre resolution to the size of the farmer's land.

In particular, provided herein is a method for downscaling a weather forecast. Preferably, the method comprises the steps of:
a) obtaining a sky image and location data indicative of a user location, by means of a mobile computing device; preferably real-time sky image and location data;
b1) sending, by the mobile computing device, the location data to a weather forecast provider;
b2) generating, by the weather forecast provider, a local weather forecast for the user location;
b3) sending, by the weather forecast provider, the local weather forecast to a server;
c) determining, by the mobile computing device, cloud cover data and cloud type data based on the sky image, and sending the cloud cover data and cloud type data to the server; or sending the sky image to the server and determining, by the server, cloud cover data and cloud type data based on the sky image; preferably real-time cloud cover data and cloud type data;
d) increasing the resolution of the local weather forecast by the remote server based on the cloud cover data and the cloud type data, thus obtaining a downscaled local weather forecast; and,
e) sending, by the remote server, the downscaled local weather forecast to the mobile computing device.

In some preferred embodiments, step d) does not step rely on historical cloud information of the user location.

In some preferred embodiments, the cloud cover data and the cloud type data are determined based on the sky image by means of an artificial neural network.

In some preferred embodiments, increasing the resolution of the local weather forecast in step d) is performed using Bayesian inference.

In some preferred embodiments, the mobile computing device comprises one or more environmental sensors;
wherein step a) further comprises obtaining, by means of the one or more environmental sensors, environmental information comprising atmospheric pressure, humidity, and/or temperature;
wherein step c) comprises sending, by the mobile computing device, the environmental information to the remote server; and,
wherein the act of increasing the resolution in step d) is performed based on the environmental information in addition to the aforementioned cloud cover data and the cloud type data.

In some preferred embodiments, determining the cloud cover data and the cloud type data in step c) involves the use of a cloud segmentation algorithm.

In some preferred embodiments, step b1) comprises sending, by the mobile computing device, the location data to a plurality of weather forecast providers;

step b2) comprises generating, by the plurality of weather forecast providers, a plurality of local weather forecasts for the user location;

step b3) comprises sending, by the plurality of weather forecast providers, the plurality of local weather forecasts to a remote server;

a step d0) is executed between step c) and step d), step d0) comprising comparing the plurality of weather forecasts with the location data, the cloud cover data, the cloud type data, and optionally the environmental information, and based on this comparison, selecting the weather forecast which best corresponds to the location data, the cloud cover data, the cloud type data, and optionally the environmental information, as the most accurate weather forecast; and, the most accurate weather forecast is downscaled in step d).

In some preferred embodiments, wherein the sky image or the cloud cover and cloud type data are communicated between the mobile computing device and the remote server by means of a direct data link or via an alternative communication means such as an SMS gateway.

In some preferred embodiments, the sky picture is taken in the direction of the zenith, within a margin of error of 45°.

In some preferred embodiments, the location data are GPS location data.

In some preferred embodiments, the mobile computing device is a smartphone.

Provided herein is also a method for downscaling a weather forecast, the method comprising the steps of:

a) receiving, from a mobile computing device, location data indicative of a user location; preferably real-time location data;

b) requesting and receiving a local weather forecast for the user location;

c) receiving cloud cover data and cloud type data from the mobile computing device, or receiving a sky image from the mobile computing device and determining cloud cover data and cloud type data based on the sky image; preferably real-time sky image, cloud cover, and/or cloud type data;

d) increasing the resolution of the local weather forecast based on the cloud cover data and the cloud type data, thus obtaining a downscaled local weather forecast; and, e) sending the downscaled local weather forecast to the mobile computing device.

Provided herein is also a method for downscaling a weather forecast, the method comprising the steps of:

a) obtaining a sky image and location data indicative of a user location; preferably real-time sky image and location data;

b) sending the location data to a weather forecast provider;

c) determining cloud cover data and cloud type data based on the sky image, and sending the cloud cover data and cloud type data to a server; or sending the sky image to the server; preferably real-time cloud cover and cloud type data; and, d) receiving a downscaled local weather forecast from the server.

Provided herein is also a system configured for executing any method as described herein.

Provided herein is also a server configured for executing any method as described herein.

Provided herein is also a mobile computing device configured for executing any method as described herein.

The present methods and systems provide users with best-in-class hyperlocal weather forecasts. They allow providing the most accurate short-term forecast based on their location, time, and current weather conditions.

DESCRIPTION OF THE FIGURES

The following description of the figures of specific embodiments of the invention is only given by way of example and is not intended to limit the present explanation, its application or use. In the drawings, identical reference numerals refer to the same or similar parts and features.

The following reference numerals are used in the description and figures:

1—Acquisition of local weather data and position data; 2—Cloud image detection; 3—Weather forecast acquisition; 4—Weather forecast recalibration; 5—Delivery of downscaled weather forecasts; 6—User; 7—Sky image; 8—Cloud detection based on sky image; 9—GPS location; 10—Weather forecast provider; 11—Weather forecasts; 12—Forecast recalibration; 13—Delivery of downscaled weather forecasts.

DESCRIPTION OF THE INVENTION

As used below in this text, the singular forms "a", "an", "the" include both the singular and the plural, unless the context clearly indicates otherwise.

The terms "comprise", "comprises" as used below are synonymous with "including", "include" or "contain", "contains" and are inclusive or open and do not exclude additional unmentioned parts, elements or method steps. Where this description refers to a product or process which "comprises" specific features, parts or steps, this refers to the possibility that other features, parts or steps may also be present, but may also refer to embodiments which only contain the listed features, parts or steps.

The enumeration of numeric values by means of ranges of figures comprises all values and fractions in these ranges, as well as the cited end points.

The term "approximately" as used when referring to a measurable value, such as a parameter, an amount, a time period, and the like, is intended to include variations of +/−10% or less, preferably +/−5% or less, more preferably +/−1% or less, and still more preferably +/−0.1% or less, of and from the specified value, in so far as the variations apply to the invention disclosed herein. It should be understood that the value to which the term "approximately" refers per se has also been disclosed.

All references cited in this description are hereby deemed to be incorporated in their entirety by way of reference.

Unless defined otherwise, all terms disclosed in the invention, including technical and scientific terms, have the meaning which a person skilled in the art usually gives them. For further guidance, definitions are included to further explain terms which are used in the description of the invention.

The present disclosure is in the field of local weather forecasting. Hyperlocal weather forecasting as provided herein empowers farmers by providing on-demand, live, and relatively accurate weather information that they could use for agronomic decision-making.

With this information, they can re-align their farming strategies by reacting dynamically, quickly, and as a consequence, improve their crop performance by optimizing the resource inputs and maximizing its outputs.

Provided herein is a method for downscaling weather forecasts. The method comprises the following steps:
a) obtaining a sky image and location data indicative of a user location, by means of a mobile computing device; preferably real-time sky image and location data;
b1) sending, by the mobile computing device, the location data to a weather forecast provider;
b2) generating, by the weather forecast provider, a local weather forecast for the user location;
b3) sending, by the weather forecast provider, the local weather forecast to a server;
c) determining, by the mobile computing device, cloud cover data and cloud type data based on the sky image, and sending the cloud cover data and cloud type data to the remote server; or sending the sky image to the server and determining, by the server, cloud cover data and cloud type data based on the sky image;
d) increasing the resolution of the local weather forecast by the remote server based on the cloud cover data and the cloud type data, thus obtaining a downscaled local weather forecast; preferably real-time cloud cover data and cloud type data; and,
e) sending, by the remote server, the downscaled local weather forecast to the mobile computing device.

These methods described herein provide users with highly local weather data, thus providing improved weather forecasts and allowing more efficient crop production. Furthermore, the methods described herein do not require historical cloud information.

Therefore, in some embodiments, the methods as described herein do not rely on historical cloud information of the user location. In some preferred embodiments, step d) does not rely on historical cloud information of the user location. The sky image can be used to track the exact real-time location of clouds, and allows for the forecast to be adapted based on discrepancies between the tracked location of the clouds and the predicted location.

The term "mobile computing device" as used herein refers to a portable electronic device comprising display means, information processing means, and communication means. One example of a mobile computing device is a smartphone. Preferably, the sky image and location data indicative of a user location is obtained by means of a single mobile computing device.

Using a mobile device instead of fixed devices means that the method can be applied anywhere: the user just needs to be on the desired spot and take an image. With mobile devices users can take pictures in any direction, whenever and wherever they would want.

Since the process does not require continuous acquisition of images, therefore, a fixed non-movable device is not required. A mobile device has the advantage that it is movable, and not geographically fixed. Therefore, the methods as described herein no not require a network of fixed, non-movable image acquisition devices. Such a device also has the advantage that it is a singular device that can be operated independently. Therefore, the methods as described herein no not require a more cumbersome plurality of devices in a plurality of geographical locations.

The term "real-time" as used herein refers to measurements or data are that performed at the time the method is performed, within a relatively short timeframe. This timeframe is preferably at most 4 hours, for example at most 2 hours, for example at most 1 hour, for example 1 most 30 minutes, for example at most 15 minutes, for example at most 10 minutes, for example at most 8 minutes, for example at most 6 minutes, for example at most 4 minutes, for example at most 2 minutes, for example at most 1 minute. The term "real-time" refers to measurements and data that are opposed to "historical" data, which was typically obtained days, weeks, months or even years before.

Additionally or alternatively, step c) of the aforementioned method may be formulated as follows: probing for the presence of a high bandwidth wireless communications network between the mobile computing device and the remote server, and executing the following sub-steps:
  ci) if the presence of a high bandwidth wireless communications network between the mobile computing device and the remote server is detected, sending, by the mobile computing device, the sky image to the server and determining, by the server, cloud cover data and cloud data based on the sky image; or
  cii) if the absence of a high bandwidth wireless communications network between the mobile computing device and the remote server is detected, determining, by the mobile computing device, cloud cover data and cloud type data based on the sky image, and sending the cloud cover data and the cloud type data to the remote server.

Such an execution of step c) allows an optimum allocation of resources. Indeed, computational resources on mobile computing devices such as smartphones are relatively limited. Accordingly, it is desirable to perform computationally intensive tasks such as image analysis on a remote server. However, sending images over a wireless communications network involves sending a large amount of data over the network. When the network has a limited amount of bandwidth, as is commonly the case in rural areas, it is more efficient to analyse the images on the mobile computing device and then send cloud cover data and cloud type data (which is significantly less bulky than image data) over the network.

The term "high-bandwidth wireless communication network" as used herein refers to a wireless communications network in which users are allocated a bandwidth which is higher than a pre-determined level.

In some embodiments, the act of determining, by the mobile computing device, cloud cover data and cloud type data based on the sky image in step c) comprises the following sub-steps: image acquisition, desaturation, colour depth reduction to binary black and white, and detection. This sequence of steps improves the accuracy of the present methods.

In some embodiments, the wireless communication network comprises a local area network. In some embodiments, the wireless communication network comprises a satellite communications network. In other words, the mobile computing device and the remote server may communicate with each other by means of a machine-to-machine (M2M) communications protocol. These communication networks are especially suitable for use in rural areas.

In some embodiments, the cloud cover data and the cloud type data are determined based on the sky image by means of a machine learning method, preferably an artificial neural network. Preferably, the artificial neural network was previously trained by means of a training set consisting of previously collected sky pictures which were tagged based on cloud type and cloud cover. In some embodiments, the machine learning method (for example running on a server) uses nearby images captured by other devices to further improve accuracy.

In some embodiments, increasing the resolution of the local weather forecast in step d) is performed using Bayesian inference. More preferably, increasing the resolution of the local weather forecast in step d) is performed using Bayesian inference and an artificial neural network.

In some embodiments, the mobile computing device comprises one or more environmental sensors. In these embodiments, step a) preferably further comprises obtaining, by means of the one or more environmental sensors, environmental information comprising atmospheric pressure, humidity, and/or temperature. Also, step c) preferably comprises sending, by the mobile computing device, the environmental information to the remote server. In addition, the act of increasing the resolution in step d) is preferably performed based on the environmental information in addition to the aforementioned cloud cover data and the cloud type data. The use of local sensor data as provided in these embodiments further enhances the accuracy of the present weather forecast downscaling methods.

In some embodiments, determining the cloud cover data and the cloud type data in step c) involves the use of a cloud segmentation algorithm.

In some embodiments, the cloud segmentation algorithm involves the use of a non-parametric method, preferably a k-NN algorithm, i.e. a k-Nearest Neighbours algorithm. Such algorithms are relatively small and not very computationally intensive such that they can be run on a mobile phone. Thus, such algorithms enable offline computation of the cloud type and cloud cover. With offline computation of cloud type and cloud cover, the amount of data and processing time can be significantly reduced. The cloud segmentation algorithm is preferably an extension of general image segmentation algorithms which are used for object recognition in general. In some preferred embodiments, the cloud segmentation algorithm specifically identifies cloud type and determines the cloud cover.

In some embodiments, step c) comprises the step of:
c') obtaining a cloud type based on the sky image.

The cloud type can, for example, be selected from the list comprising: cirrostratus, cirrus, cirrocumulus, altostratus, altocumulus, *cumulus congestus*, cumulonimbus, nimbostratus, *cumulus mediocris, stratus*, stratocumulus, *cumulus humilis*, and/or *cumulus fractus*.

Obtaining the cloud type provides an indication of precipitation potential/probability and density. It is well known in the field of meteorology how each type of cloud carries a certain precipitation potential. For example, cirrus clouds do not lead to precipitation, whereas nimbostratus is associated with heavy rain. Preferably, the cloud type is converted into a precipitation probability percentage.

In some embodiments, step c) comprises the step of:
c") obtaining a % of cloud coverage based on the sky image.

The cloud coverage allows to fine-tune at least 2 parameters: the amount of sunshine that a parcel will receive and the amount of precipitation. In addition to the cloud type being converted into precipitation probability percentage, the cloud coverage is also a factor to determine the probability percentage. The cloud coverage also allows determining the amount of precipitation.

Cloud cover also allows determining the accuracy among weather feeds (dark sky, IBM and so on) by comparing the cloud cover with the cloud cover provided by these weather feeds. Cloud cover will also help in determining accurately if it will rain at the location. As the weather feeds are provided in the range of kilometres, it is possible that some of the locations within the range might not have overhead clouds. Hence, the probability of rain on that particular location will reduce significantly.

In some embodiments, both steps c') and c") occur, in any order. In some preferred embodiments, steps c') and/or c") are performed through classification and machine learning of an existing library of sky images.

In some embodiments, in step d) either or both of cloud type data and cloud cover data, preferably obtained in steps c') and c"), for example precipitation probability % and/or cloud cover % and %, are compared to multiple weather feeds and/or existing models (for example Darksky, IBM etc). This allows the method to asses—which weather feeds and/or existing model matches closest to the current reality depicted in the sky image for the specific location. This would then be considered the 'most accurate' forecast for that location. As the database builds, it will be able to build a "quilt-work" weather prediction service, essentially matching any specific location to the most accurate forecast provider. This solves the issue of the top weather feeds all having differing geographical variances in their accuracies. Weather feeds typically supply averages, but will not divulge that region X is not as accurate as region Y. The present methods allow eliminating such weak spots and matching the user with more granular ("downscaled") forecasts.

In some embodiments, step b1) comprises sending, by the mobile computing device, the location data to a plurality of weather forecast providers;
wherein step b2) comprises generating, by the plurality of weather forecast providers, a plurality of local weather forecasts for the user location;
wherein step b3) comprises sending, by the plurality of weather forecast providers, the plurality of local weather forecasts to a remote server;
wherein a step d0) is preferably executed between step c) and step d), step d0) comprising comparing the plurality of weather forecasts with the location data, the cloud cover data, the cloud type data, and optionally the environmental information, and based on this comparison, selecting the weather forecast which best corresponds to the location data, the cloud cover data, the cloud type data, and optionally the environmental information, as the most accurate weather forecast; and,
wherein the most accurate weather forecast is downscaled in step d).

Preferably, when two or more weather forecasts match the local weather data equally well, in other words when two (or more) weather forecasts are equidistant to the local weather data, the two or more weather forecasts are preferably averaged resulting in an averaged weather forecast, and then the averaged weather forecast is downscaled in step d).

Accordingly, the process of downscaling the local weather forecast based on a sky image can start from the most accurate starting point, which further improves the quality of the local weather forecast.

In some embodiments, the sky image or the cloud cover and cloud type data are communicated between the mobile computing device and the remote server by means of a direct data link or via an alternative communication means such as an SMS gateway.

In some embodiments, the sky picture is taken in the direction of the zenith, within a pre-determined margin of error, e.g. a margin of error of 30° to 60°, or 35° to 55°, or 40° to 50°, or 45° to 50°. In other words, the sky picture may be taken at a right or oblique angle with respect to the horizon. When the sky picture is taken at an oblique angle with respect to the horizon, the angle of the mobile computing device, e.g. phone, with respect to the horizon is taken into account to determine the approximate location of the clouds in the sky and the land underneath those clouds. Allowing a user to take the sky picture at an oblique angle increases the ease of use of the present methods. In addition, it reduces the chance that sky pictures are faulty, and thus have to be taken again.

In some embodiments, the mobile computing device comprises image acquisition means, e.g. a camera, which is locked when the mobile computing device is oriented at an angle with respect to the zenith which is outside of the pre-determined margin of error. This increases the uniformity by which the sky pictures are taken and thus enhances the accuracy of the present methods.

In some embodiments, the sky picture is screened. The screening involves determining whether or not the sky image is a representation of the sky. For example, if the sky image comprises less than a pre-determined amount of sky imagery, e.g. if less than 50%, less than 40%, less than 30%, or less than 20% of the sky image is an actual photograph of the sky, then the image is rejected. If the sky image comprises more than the pre-determined amount of sky imagery, then the sky image is accepted. This improves the accuracy of the present methods. Indeed, it ensures that the present methods are based on optimum sky images.

It will be understood that the aforementioned "pre-determined amount of sky imagery" does not necessarily indicate a fixed percentage. Rather, this term can also encompass an approximate value which represents a cut-off value between acceptable and unacceptable images as used in a training set of a machine learning-based sky picture screening technique.

Preferably, the screening is carried out by the server. For example, the images may be screened by means of Google Cloud Vision, which is a commercially available image recognition product.

Preferably, when the sky image comprises more than a pre-determined amount of sky imagery, one or more environmental sensors comprised in the mobile computing device are actuated to obtain environmental information, e.g. environmental information comprising atmospheric pressure, humidity, and/or temperature.

Preferably, the sky picture, the time at which the picture was taken, the angle at which the picture was taken, the location where the picture was taken, and the environmental information are sent to the server.

In some embodiments, determining the approximate location of the clouds in the sky comprises the following steps:
  determining the radius of the horizon based on the current latitude and longitude;
  assuming that the horizon is shaped like a dome above the user; and,
  determining the position of the clouds by means of a trigonometric calculation.

With approximate location of the cloud along with wind speed and direction (for example provided by weather feeds IBM, DarkSky, etc) it is possible to determine at what time the cloud will precipitate at the location.

In some embodiments, the location data are GPS location data.

In some embodiments, the mobile computing device is a smartphone.

Further provided is a system configured for executing a method for downscaling weather forecasts as described in the above embodiments.

In some embodiments, the method as described herein comprises the operation of both a mobile computing device and a remote server. In some embodiments, the system as described herein comprises both a mobile computing device and a remote server. The mobile computing device and the remote server can be seen as subsystems of the system.

The method as described herein can also be performed by one of the subsystems individually, as provided below.

Further provided is a method for downscaling a weather forecast, comprising the steps of:
a) receiving, from a mobile computing device, location data indicative of a user location; preferably real-time location data;
b) requesting and receiving a local weather forecast for the user location;
c) receiving cloud cover data and cloud type data from the mobile computing device, or receiving a sky image from the mobile computing device and determining cloud cover data and cloud type data based on the sky image; preferably real-time sky image, cloud cover, and/or cloud type data;
d) increasing the resolution of the local weather forecast based on the cloud cover data and the cloud type data, thus obtaining a downscaled local weather forecast; and,
e) sending the downscaled local weather forecast to the mobile computing device.

It shall be understood that any embodiments described above also apply to this method, mutatis mutandis. In some embodiments, this method comprises the operation of a server. The server can be seen as a subsystem.

Further provided is a server configured for executing a method downscaling a weather forecast as described above.

Further provided herein is a method for obtaining a downscaled weather forecast, comprising the steps of:
a) obtaining a sky image and location data indicative of a user location; preferably real-time sky image and location data;
b) sending the location data to a weather forecast provider;
c) determining cloud cover data and cloud type data based on the sky image, and sending the cloud cover data and cloud type data to a server; or sending the sky image to the server; preferably real-time cloud cover and cloud type data; and,
d) receiving a downscaled local weather forecast from the server.

It shall be understood that any embodiments described above also apply to this method, mutatis mutandis. In some embodiments, this method comprises the operation of a mobile computing device. The mobile computing device can be seen as a subsystem.

Further provided is a mobile computing device configured for executing a method for obtaining a downscaled weather forecast as described above.

Further provided herein is a method for growing crops, the method comprising the steps of:
a) preparing a field for planting a crop;
b) planting a crop in the field;
c) growing the crop in the field;
d) obtaining a downscaled weather forecast by means of a method as described above; and,
d) providing fertilizer and/or irrigation to the crop at a rate that takes into account the downscaled weather forecast obtained in step d).

It shall be understood that any embodiments described above also apply to this method, mutatis mutandis.

These methods improve crop yield and simultaneously reduce the amount of fertilizer that needs to be used.

EXAMPLES

Example 1

Figure 1:
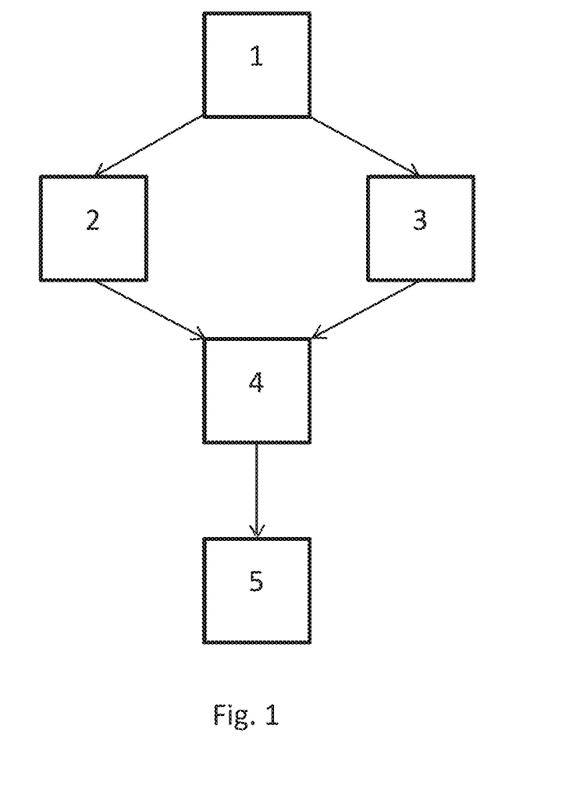
FIG. 1 shows a schematic diagram of several steps of an embodiment of a method as described herein.

In a first example, reference is made to FIG. 1 which shows a schematic diagram of several steps of an embodiment of a method as described herein.

In particular, a first stage (1) of the method involves the use of a smartphone as a means for gathering information. The smartphone's sensors are used to gather GPS location and environmental information such as atmospheric pressure, humidity, and temperature. The information obtained from the smartphone's sensors are calibrated. During calibration, the sensitivity of the mobile phone's sensors is taken into account; a lower sensor sensitivity corresponds to a higher error in the possible reading.

A second stage (2) involves the acquisition of a picture of the sky above or near a user's location. This picture is analysed by means of an artificial neural network to obtain detailed information regarding local types of clouds and the amount of cloud cover: cloud and sky composition are tracers for a variety of significant weather changes. The artificial neural network was trained by means of a training set consisting of previously collected sky pictures which were tagged based on cloud type and cloud cover.

A summary of detailed data obtained by means of the above-referenced image analysis algorithm is shown in the table below.

TABLE 1 detailed data by means of the above-referenced image analysis.

|  | Precision | Recall | f1-score | Support |
| --- | --- | --- | --- | --- |
| Pattern | 0.79 | 0.92 | 0.85 | 25 |
| Sky | 0.59 | 0.87 | 0.70 | 60 |
| Thick-Dark | 0.48 | 0.55 | 0.51 | 55 |
| Thick-White | 1.00 | 0.06 | 0.11 | 36 |
| Veil | 0.60 | 0.45 | 0.51 | 20 |
| Avg/total | 0.66 | 0.59 | 0.54 | 196 |

When the user takes the picture of the sky right above their location, the picture represents the sky above their location. When the user takes the picture at an oblique angle with respect to the horizontal plane, i.e. when the picture is taken in a direction which is not perfectly vertical, the clouds in the picture are not perfectly above the user, yet still near the user's location. The angle of the phone is taken into account to determine the approximate location of clouds in the sky and the land underneath those clouds. In particular, it is well-known that at any given location on earth, the radius of the horizon can be determined based on the current latitude and longitude (see e.g. https://rechneronline.de/sehwinkel/distance-horizon.php; accessed on Oct. 22, 2018). Assuming that the horizon is shaped like a dome above the user, a trigonometric calculation can be used to estimate the position of the clouds. Clouds at 90 degrees are directly above a user. Clouds at a zero degree angle are at the edge of the horizon, and an angle between 0 and 90° indicates clouds at a position between these extremes.

By means of machine learning algorithms, cloud segmentation is performed, and the amount of cloud cover and cloud type is calculated from the picture. One suitable algorithm for this purpose is k-NN, or k-nearest neighbours, which is a non-parametric method that is suitable for classification and regression. Such algorithms may be run on the user's mobile phone or on a remote server.

When the smartphone has good network connectivity, the algorithms may be run on a remote server to lessen the computational load on the smartphone. On the other hand, when the smartphone has no or poor connectivity, the algorithm may be run on the mobile phone itself. Of course, the algorithm may also be run on the mobile phone itself when the phone has good connectivity, depending on e.g. the cost of network traffic. Accordingly, the algorithms are optimized for mobile applications.

The algorithms which are run on a mobile phone in methods according to the present methods have the advantage of being small (i.e. consuming a relatively small amount of memory) and not computationally intensive. These advantages allow implementing the algorithms in mobile phone hardware and enable offline computation of the cloud type and cloud cover. In other words, they work independently from connectivity.

The data from the smartphone's sensor, the cloud cover data, and the cloud type data is then communicated to a remote server. Both the amount of cloud cover and the type of clouds have a major impact on the weather. The communication may either occur via satellite communications or wireless local area networks.

Satellite communications enable cell phone communication from a phone to a nearby antenna which is generally less than 10 to 15 miles (ca. 16 to 24 km) away. Example of such satellite communications protocols are GSM, GPRS, CDMA, 2G, 3G, 4G/LTE, EDGE, and others. In Internet of Things terminology, these types of communications are mostly referred to as "M2M", or Machine-to-Machine because they allow a phone to send and receive data through such a network.

One wireless suitable local area network (WLAN) is WiFi. WiFi utilizes the IEEE 802.11 standard through 2.4 GHz UHF and 5 GHz ISM frequencies. WiFi provides internet access to devices that are within a limited range from an access point, typically about 66 feet (ca. 20 m) from the access point.

In the context of the present systems and methods, satellite communications are generally preferred over wireless local networks because the present systems and methods are commonly used for weather forecast downscaling in rural areas.

Alternatively, the mobile computing device and the remote server may communicate via a direct data link or via alternative communication means such as an SMS gateway. Alternative communication means are especially suitable when a direct datalink between is not available.

In a third stage (3), the GPS location data that were obtained in stage 1 are used to collect weather forecasts from a plurality of weather forecast providers. Examples of commercial weather forecast providers are IBM weather and Dark Skyweather forecasts. These weather forecasts are based on cloud images obtained from satellite remote sensing which allow understanding past and present weather processes in a macroscopic way. For the purpose of the present example, the weather forecast providers are named alpha, beta, and gamma.

In a fourth stage (4), the weather forecasts from the weather forecast providers are compared with the information which was collected in the first and second stage. The fourth stage is typically performed on the remote server. The weather forecast which corresponds best with the collected information is selected as the correct forecast. Accordingly, real-time, ground-based information (truth information) is used to pick the best forecast provider based on the highest accuracy of the weather for the current day. For the purpose of the present example, it is assumed that the most accurate weather forecast provider was determined to be alpha.

Then, the data from the smartphone's sensor, the cloud cover data, and the cloud type data is used along with the weather forecast that was identified as the most accurate to further improve on that forecast. In particular, using Bayesian inference, the forecasts are adjusted based on the mismatch from the mobile-based cloud estimate and those from the forecasts. Thus, a downscaled weather forecast with increased resolution is obtained.

Example 2

Figure 2:
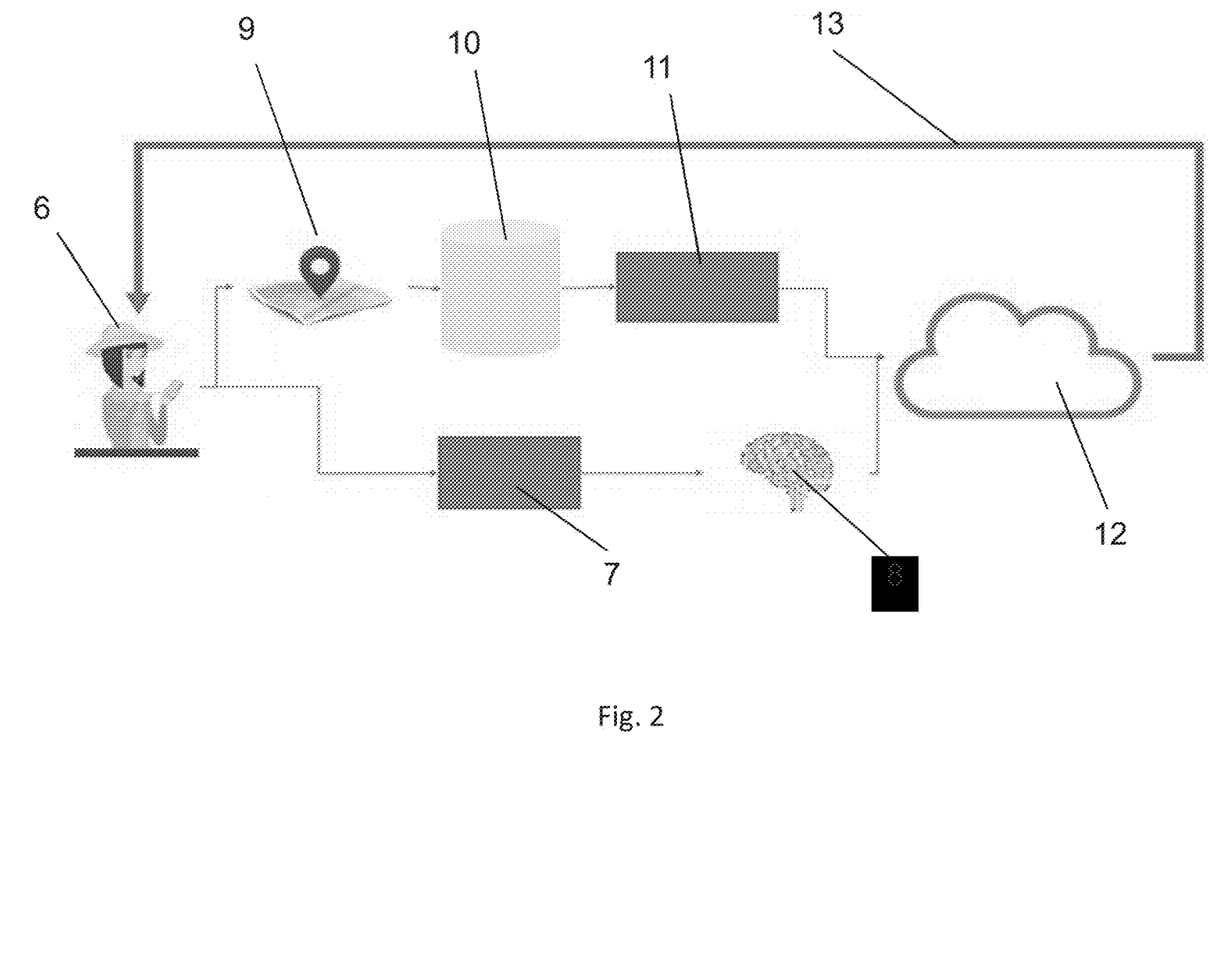
FIG. 2 shows an exemplary flow of information which occurs in an embodiment of a method as described herein.
Figure 3:
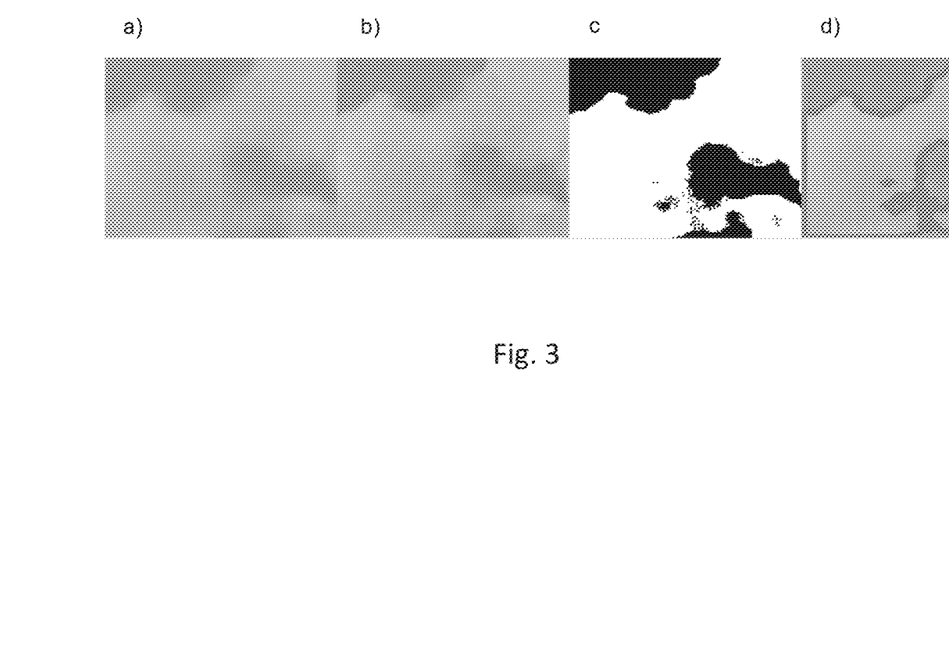
FIG. 3 shows a sequence of image analysis steps used in an embodiment of a method as described herein.

In a second example, reference is made to FIGS. 2 and 3.

FIG. 2 shows an exemplary flow of information that occurs in a method of example 1. In particular, a user (6) takes a sky image (7) by means of a mobile phone. The sky image (7) is used by the mobile phone to detect cloud cover and cloud type data (8), which is sent to a remote server. The user's mobile phone is also used to acquire the user's GPS coordinates (9). These coordinates are sent to one or more weather forecast providers (10), which send weather forecasts (11) to the remote server. The remote server is used for weather forecast recalibration (12): the weather forecasts (10) are downscaled by means of cloud cover and cloud type data (8) by means of the remote server. Thus, downscaled weather forecasts are obtained which are then delivered (13) to the user (6).

FIG. 3 shows an exemplary sequence of image analysis steps. In particular, the sequence comprises the following steps: a) image acquisition, b) desaturation, c) colour depth reduction to binary black and white, and d) edge detection. This sequence of steps improves the accuracy of the present methods.

The invention claimed is:

1. A method for downscaling a weather forecast, comprising the steps of:
   a) obtaining a sky image and location data indicative of a user location, by means of a mobile computing device;
   b1) sending, by the mobile computing device, the location data to a weather forecast provider;
   b2) generating, by the weather forecast provider, a local weather forecast for the user location;
   b3) sending, by the weather forecast provider, the local weather forecast to a server;
   c) determining, by the mobile computing device, cloud cover data and cloud type data based on the sky image, and sending the cloud cover data and cloud type data to the server; or, sending the sky image to the server and determining, by the server, cloud cover data and cloud type data based on the sky image;
   d) increasing resolution of the local weather forecast by the server based on the cloud cover data and the cloud type data, thus obtaining a downscaled local weather forecast; and
   e) sending, by the server, the downscaled local weather forecast to the mobile computing device.

2. The method according to claim 1, wherein the cloud cover data and the cloud type data are determined based on the sky image by means of an artificial neural network.

3. The method according to claim 1, wherein increasing the resolution of the local weather forecast in step d) is performed using Bayesian inference.

4. The method according to claim 1, wherein the mobile computing device comprises one or more environmental sensors;
   wherein step a) further comprises obtaining, by means of the one or more environmental sensors, environmental information comprising atmospheric pressure, humidity, and/or temperature;
   wherein step c) comprises sending, by the mobile computing device, the environmental information to the server; and
   wherein the increasing of the resolution in step d) is performed based on the environmental information in addition to the cloud cover data and the cloud type data.

5. The method according to claim 4,
   wherein step b1) comprises sending, by the mobile computing device, the location data to a plurality of weather forecast providers;
   wherein step b2) comprises generating, by the plurality of weather forecast providers, a plurality of local weather forecasts for the user location;
   wherein step b3) comprises sending, by the plurality of weather forecast providers, the plurality of local weather forecasts to a remote server;
   wherein a step d0) is executed between step c) and step d), step d0) comprising comparing the plurality of weather forecasts with the location data, the cloud cover data, the cloud type data, and the environmental information, and based on this comparison, selecting the weather forecast which best corresponds to the location data, the cloud cover data, the cloud type data, and the environmental information, as a most accurate weather forecast; and
   wherein the most accurate weather forecast is downscaled in step d).

6. The method according to claim 1, wherein determining the cloud cover data and the cloud type data in step c) involves a use of a cloud segmentation algorithm.

7. The method according to claim 1,
   wherein step b1) comprises sending, by the mobile computing device, the location data to a plurality of weather forecast providers;
   wherein step b2) comprises generating, by the plurality of weather forecast providers, a plurality of local weather forecasts for the user location;
   wherein step b3) comprises sending, by the plurality of weather forecast providers, the plurality of local weather forecasts to a remote server;
   wherein a step d0) is executed between step c) and step d), step d0) comprising comparing the plurality of weather forecasts with the location data, the cloud cover data, and the cloud type data, and based on this comparison, selecting the weather forecast which best corresponds to the location data, the cloud cover data, and the cloud type data as a most accurate weather forecast; and
   wherein the most accurate weather forecast is downscaled in step d).

8. The method according to claim 1, wherein the sky image or the cloud cover and cloud type data are communicated between the mobile computing device and the server by means of a direct data link or via an alternative communication means such as an SMS gateway.

9. The method according to claim 1, wherein the sky image is taken in a direction of a zenith, within a margin of error of 45°.

10. The method according to claim 1, wherein the location data are GPS location data.

11. The method according to claim 1, wherein the mobile computing device is a smartphone.

12. A system configured for executing a method according to claim 1.

13. The method according to claim 1, wherein the sky image and location data is real-time sky image and location data, and the cloud cover data and cloud type data is real-time cloud cover data and cloud type data.

14. The method according to claim 1, wherein the server is remote from the user location.

15. A method for downscaling a weather forecast, comprising the steps of:
- a) receiving, from a mobile computing device, location data indicative of a user location;
- b) requesting and receiving a local weather forecast for the user location;
- c) receiving cloud cover data and cloud type data from the mobile computing device, or receiving a sky image from the mobile computing device and determining cloud cover data and cloud type data based on the sky image;
- d) increasing a resolution of the local weather forecast based on the cloud cover data and the cloud type data, thus obtaining a downscaled local weather forecast; and
- e) sending the downscaled local weather forecast to the mobile computing device.

16. A server configured for executing a method according to claim 15.

17. The method according to claim 15, wherein the location data is real-time location data and the cloud cover data, and the sky image, cloud cover and/or cloud type data is real-time sky image, cloud cover and/or cloud type data.

18. A method for obtaining a downscaled weather forecast, comprising the steps of:
- a) obtaining a sky image and location data indicative of a user location;
- b) sending the location data to a weather forecast provider to obtain local weather forecast for the us location;
- c) determining cloud cover data and cloud type data based on the sky image, and sending the cloud cover data and cloud type data to a server; or sending the sky image to the server; and
- d) receiving a downscaled local weather forecast from the server, the downscaled local weather forecast obtained by increasing resolution of the local weather forecast based on the cloud cover data and the cloud type data received by the server or based on cloud cover data and cloud type data determined from the sky image received by the server.

19. A mobile computing device configured for executing a method according to claim 18.

20. The method according to claim 18, wherein the sky image and location data is real-time sky image and location data, and the cloud cover data and cloud type data is real-time cloud cover data and cloud type data.

21. The method according to claim 18, wherein the server is remote from the user location.

\* \* \* \* \*